(12) United States Patent
Guschlbauer et al.

(10) Patent No.: US 12,549,012 B2
(45) Date of Patent: Feb. 10, 2026

(54) ENERGY MANAGEMENT SYSTEM

(71) Applicant: Fronius International GmbH, Pettenbach (AT)

(72) Inventors: Florian Guschlbauer, Pettenbach (AT); Dominik Pfaffenbichler, Pettenbach (AT); Johannes Muehlegger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 453 days.

(21) Appl. No.: 18/255,460

(22) PCT Filed: Dec. 6, 2021

(86) PCT No.: PCT/EP2021/084355
§ 371 (c)(1),
(2) Date: Jun. 1, 2023

(87) PCT Pub. No.: WO2022/117887
PCT Pub. Date: Jun. 9, 2022

(65) Prior Publication Data
US 2024/0030717 A1 Jan. 25, 2024

(30) Foreign Application Priority Data
Dec. 4, 2020 (EP) ..................... 20211950

(51) Int. Cl.
*H02J 3/38* (2006.01)
*H02J 13/00* (2006.01)
(52) U.S. Cl.
CPC ........ *H02J 3/381* (2013.01); *H02J 13/00001* (2020.01); *H02J 2300/24* (2020.01)

(58) Field of Classification Search
CPC .. H02J 3/381; H02J 13/00001; H02J 2300/24; H02J 3/14; H02J 3/388; H02J 3/00; Y02E 10/56
See application file for complete search history.

(56) References Cited

U.S. PATENT DOCUMENTS

| 2014/0222232 A1* | 8/2014 | Kamel | ...................... H02J 3/00 705/412 |
| 2020/0091726 A1 | 3/2020 | Bhowmik | |
| 2023/0019768 A1* | 1/2023 | Fletcher | ............... G05B 19/042 |

FOREIGN PATENT DOCUMENTS

| EP | 3 386 058 A1 | 10/2018 |
| JP | 2014-119288 A | 6/2014 |
| JP | 2015-139331 A | 7/2015 |

OTHER PUBLICATIONS

International Search Report corresponding to PCT Application No. PCT/EP2021/084355, mailed Mar. 10, 2022 (English language document) (3 pages).

* cited by examiner

*Primary Examiner* — Charles Cai
(74) *Attorney, Agent, or Firm* — Maginot, Moore & Beck

(57) ABSTRACT

An energy management system for managing an energy flow of a photovoltaic system comprising a user interface used to notify a user about an emergency operation mode of the photovoltaic system triggered by a power supply grid failure and to provide recommendations for the user with respect to a handling of power-consuming loads of a load network of the photovoltaic system during the power supply grid failure.

14 Claims, 4 Drawing Sheets

ENERGY MANAGEMENT SYSTEM

RELATED APPLICATIONS

This application is a 35 U.S.C. § 371 National Stage Application of PCT/EP2021/084355 filed on Dec. 6, 2021, which claims the benefit of priority to Serial No. EP 20211950.9, filed on Dec. 4, 2020, in the EPO, the disclosures of which are incorporated herein by reference in their entirety.

FIELD OF THE INVENTION

The invention relates to an energy management system adapted to manage and control energy flows between entities of a photovoltaic system.

BACKGROUND OF THE INVENTION

A photovoltaic system comprises an inverter which is provided to convert a direct current (DC) power generated by photovoltaic modules of a photovoltaic array into alternating current (AC) power. The generated AC power can be supplied in a normal operation mode of the photovoltaic system to a power supply grid. A local load network can also be powered by the AC power generated by the inverter of the photovoltaic system. This load network can comprise a wide variety of consumer appliances consuming AC power generated by the inverter. Further, the inverter can also be connected to a local storage unit to store energy locally. Accordingly, there are different energy flows between the inverter and other entities. When the photovoltaic array receives solar irradiation, it generates a DC current and energy flows from the photovoltaic array to the inverter.

Devices of the load network receive energy from the AC side of the inverter. Further, energy can also be stored by the inverter in the local storage unit.

EP 2 941 809 B1 describes an energy control system configured to control the transmission of energy to an electrical load. The energy control system comprises a renewable energy resource, a stored energy resource, a memory configured to store program instructions and an energy system controller. The energy controller of the energy control system has a predictor module, a dispatch planner module and a dispatch module which controls the transmission of energy between the stored energy resource to the electrical load and to the storage device.

EP 3 386 058 A1 describes a method for configuring a load shedding controller adapted to control a micro-grid that includes a photovoltaic system. The load shedding controller is configured to control a switching device through which the micro-grid is connected to or disconnected from a main grid. The load shedding controller can be configured by a user via a user interface on a computer display.

JP 2015 139331 A discloses a solar cell display part that displays whether or not a solar cell is connected with a power storage system.

JP 2014 119288 A discloses an energy management system comprising a display unit for displaying an object corresponding to a load and a control unit for controlling a display mode of the object according to a power storage amount of a storage battery so as to display a time length where the load can be operated by electric power supplied from a storage battery device.

US 2020/0091726 A discloses property power system that includes multiple photovoltaic (PV) panels to generate DC electrical energy from solar energy and a first power conversion module to convert between DC and AC electrical energy and to control aspects of each PV panel. The property power system can have a group of battery blades to store electrical energy and another power conversion module to convert between DC and AC electrical energy and to control aspects of each battery blade. The property power system can have a multiple synchronization interfaces configured to aggregate the AC electrical energy of each of the PV panels/battery blades, respectively, and to control delivery of the aggregated AC electrical energy. The property power system can include a grid circuit disconnector to prevent back-feed of power during grid outage condition while the PV panels or the group of battery blades is powering an electrical load center of the property.

During a normal operation of the photovoltaic system, the system is connected to the power supply grid or power supply network. There can be an energy flow from the photovoltaic system to the power supply grid or vice versa. However, in an emergency situation, the photovoltaic system is disconnected from the power supply grid. This situation requires an efficient energy management.

SUMMARY OF THE INVENTION

Accordingly, it is an object of the present invention to provide an energy management system adapted to handle efficiently the energy flows during a situation where the photovoltaic system is disconnected from the power supply grid.

This object is achieved according to a first aspect of the present invention which provides an energy management system adapted to manage an energy flow within a photovoltaic system and to run an energy flow manager. The energy management system comprises a user interface configured to notify a user about an emergency operation mode of the photovoltaic system triggered by a power supply grid failure and to provide recommendations for the user with respect to a handling of power-consuming loads of a load network of the photovoltaic system during the power supply grid failure, to enable a sufficient power supply for as long as possible.

In a possible embodiment of the energy management system according to the first aspect of the present invention, the photovoltaic system comprises an inverter adapted to convert a DC power generated by photovoltaic modules of a photovoltaic array into AC power supplied in a normal operation mode of the photovoltaic system via a measurement device into the power supply grid.

In a further possible embodiment of the energy management system according to the first aspect of the present invention, the inverter is connected to at least one storage unit of the photovoltaic system used to store electrical power.

In a further possible embodiment of the energy management system according to the first aspect of the present invention, the energy flow manager is adapted to monitor and control the energy flows between the inverter and other entities of the photovoltaic system connected to the inverter, in particular power-consuming devices of the load network of the photovoltaic system, including the energy flow from the photovoltaic array to a DC side of the inverter and the energy flow from the inverter to the at least one storage unit of the photovoltaic system and the energy flow between the photovoltaic system and the power supply grid.

In a further possible embodiment of the energy management system according to the first aspect of the present invention, the energy flow manager is executed on a processor adapted to calculate momentary energy flows, in particular momentary current flows, depending on data provided by different entities of the photovoltaic system including the measurement device and/or the power-consuming loads of the load network.

In a further possible embodiment of the energy management system according to the first aspect of the present invention, if a power supply grid failure has been detected on the basis of data provided by the measurement device, then an emergency switch of the photovoltaic system is automatically opened by a controller of the inverter or by the energy flow manager to disconnect the power supply grid automatically from the photovoltaic system causing the interruption of the energy flow between the inverter and the power supply grid as long as the photovoltaic system does operate in the emergency operation mode.

In a still further possible embodiment of the energy management system according to the first aspect of the present invention, the energy flow manager is executed on a processor of an energy management system of the photovoltaic system.

In an alternative embodiment of the energy management system according to the first aspect of the present invention, the energy flow manager is executed on a server of a cloud-based web portal connected via an Internet connection to the photovoltaic system.

In a further possible embodiment of the energy management system according to the first aspect of the present invention, if an interruption of the Internet connection caused by the power supply grid is detected, the energy flow manager executed on the processor of the energy management system is adapted to notify the user by means of the user interface about the emergency operation mode of the photovoltaic system triggered by the power supply grid failure and/or about the interruption of the Internet connection caused by the power supply grid failure.

In a further possible embodiment of the energy management system according to the first aspect of the present invention, the user interface is integrated in a user equipment communicating with the energy management system.

In a further possible embodiment of the energy management system according to the first aspect of the present invention, the user interface is integrated in the energy management system of the photovoltaic system.

In a further possible embodiment of the energy management system according to the first aspect of the present invention, the user equipment is integrated into a visual display unit, in particular a LED display board.

In a further possible embodiment of the energy management system according to the first aspect of the present invention, the user equipment comprises an energy management application adapted to inform the user via the user interface of the user equipment about the current operation mode of the photovoltaic system and to output predictions and/or recommendations to the user as how to handle the power-consuming loads of the load network of the photovoltaic system during the current operation mode of the photovoltaic system.

The energy flow manager may inform the user via the energy management application. In this embodiment, the energy management application acts as a bridge between a user and the energy flow manager. The energy flow manager is adapted to receive user inputs as a response for recommendations via the energy management application.

In a further possible embodiment of the energy management system according to the first aspect of the present invention, the predictions and recommendations are calculated by the energy flow manager for the emergency operation mode of the photovoltaic system on the basis of collected data provided by the entities of the photovoltaic system during the emergency operation mode and on the basis of the data calculated during the normal operation mode of the photovoltaic system before the power supply grid failure has been detected and the emergency switch has been opened by the controller of the inverter or by the energy flow manager to interrupt the energy flow between the photovoltaic system and the power supply grid.

In a possible embodiment, the collected data is stored in a local data memory of the energy management system.

In a possible embodiment of the energy management system according to the first aspect of the present invention, the collected data comprises solar generation capacity data, solar irradiation data, solar generation capacity forecast data, load usage and power consumption data, load usage and power consumption forecast data, load priority data, initial user input data, storage unit energy level data, user input data, in particular responses to predictions and recommendations, and measurement device data generated by the measurement device.

In a further possible embodiment of the energy management system according to the first aspect of the present invention, the recommendations calculated by the energy flow manager based on the collected data comprise recommendations with respect to performing a fully automatic, semi-automatic and/or manual shutdown of the power-consuming loads of the load network and/or a reduced power consumption of the power-consuming loads of the load network of the photovoltaic system during its operation in the emergency operation mode.

In a further possible embodiment of the energy management system according to the first aspect of the present invention, different loads of the load network of the photovoltaic system are configurable by the user as to perform a fully automatic, semi-automatic or a manual shutdown and/or a reduced power consumption in the emergency operation mode notified to the user via the user interface of the photovoltaic system.

In a further possible embodiment of the energy management system according to the first aspect of the present invention, the user equipment communicating with the energy management system comprises a mobile user equipment such as a smartphone connected via a wireless link with the energy management system of the photovoltaic system.

The invention provides according to a further aspect a method for managing an energy flow of a photovoltaic system.

BRIEF DESCRIPTION OF THE DRAWINGS

In the following, possible embodiments of the different aspects of the present invention are described in more detail with reference to the enclosed figures.

DETAILED DESCRIPTION OF EMBODIMENTS

Figure 1:
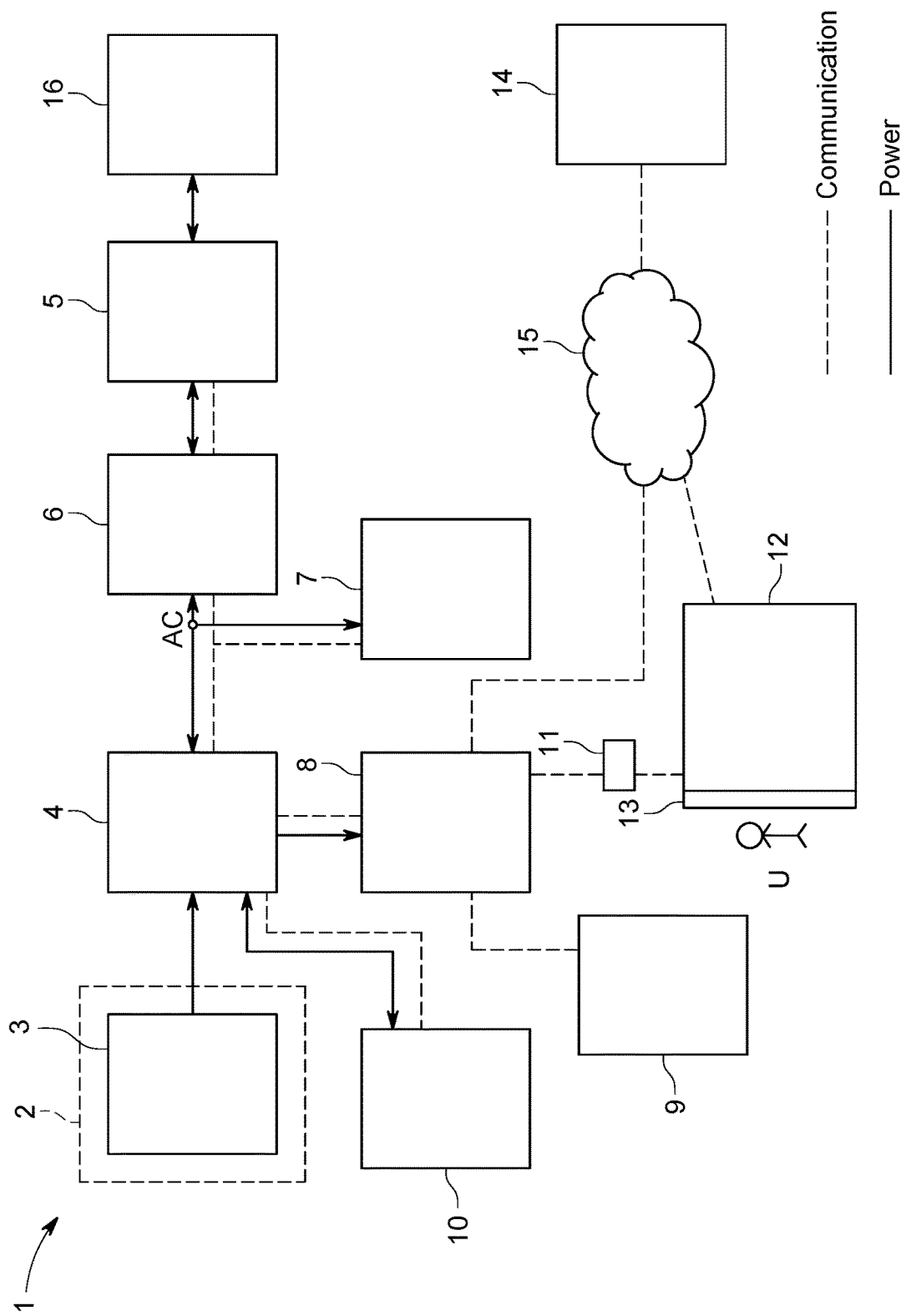
FIG. 1 shows a block diagram for illustrating a possible exemplary embodiment of an energy management system according to the first aspect of the present invention.

FIG. 1 illustrates schematically a possible exemplary embodiment of a photovoltaic system 1 comprising an energy management system 8 for managing energy flows of the photovoltaic system 1. The photovoltaic system 1 comprises at least one photovoltaic array 2 comprising photovoltaic modules 3 adapted to generate a direct current DC power supplied to the DC side of an inverter 4. The inverter 4 is adapted to convert the received DC power generated by the photovoltaic modules 3 of the photovoltaic array 2 into an alternating current AC power. The AC power generated by the inverter 4 can be supplied via AC lines and a measurement device 5 to a power supply grid 16 connected to the photovoltaic system 1.

The photovoltaic system 1 comprises in the illustrated embodiment further an emergency switch 6 which is adapted to interrupt the connection between the photovoltaic system 1 and the power supply grid 16 in case of an emergency situation, in particular if a power supply grid failure of the power supply grid 16 has been detected by the measurement device 5

On the AC side of the inverter 4, a load network 7 can be connected to the AC lines as shown in FIG. 1. The load network 7 comprises a plurality of power-consuming devices. For example, a power consuming device is a washing machine in a private household. Another example of the power-consuming device of the load network 7 is a machine of a fabrication facility. The load network 7 can comprise several loads of different types which consume AC power generated by the inverter 4.

The photovoltaic system 1 as illustrated in FIG. 1 further comprises an energy management system 8 which can be also connected to the inverter 4 of the photovoltaic system 1. The energy management system 8 can comprise a local data memory 9 adapted to store data. The memory 9 can also be integrated in the energy management system 8.

Figure 4:
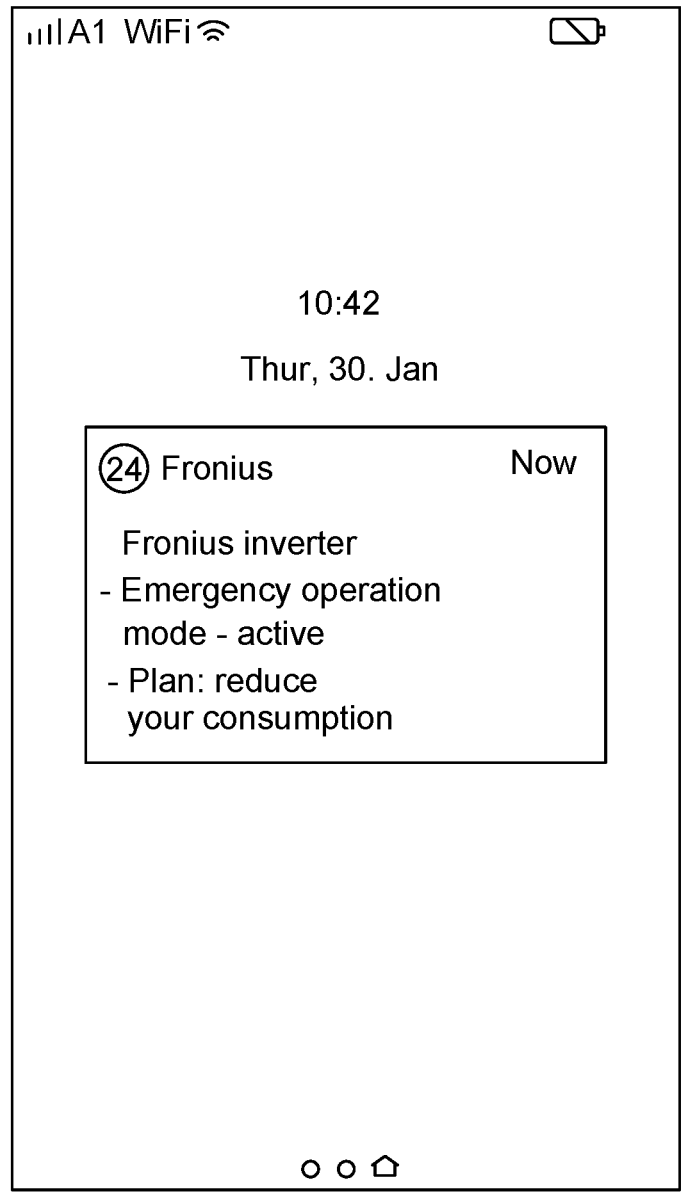
FIG. 4 shows a possible exemplary implementation of a graphical user interface of a user equipment

Further, a storage unit 10 can be provided to store electrical energy locally in the photovoltaic system 1. This storage unit 10 can comprise a battery adapted to store DC power. In the illustrated exemplary embodiment of FIG. 1, the energy management system 8 comprises an access point 11 having a wireless link to a mobile user equipment 12 of a user U as illustrated in FIG. 1. In an alternative embodiment, the energy management system 8 can also be connected via a data interface to a stationary user terminal. The user equipment 12 comprises a user interface 13 to display information to the user U as shown in FIG. 4, for example, recommendations for the user U to handle power-consuming devices of the load network 7 of the photovoltaic system 1 during the power supply grid failure.

The energy management unit 8 of the photovoltaic system 1 as illustrated in FIG. 1 makes use of the user interface 13 to notify the user U about an emergency operation mode of the photovoltaic system 1 which is triggered by a power supply grid failure of the power supply grid 16 and to provide recommendations for the user U with respect to handling of power-consuming devices of the load network 7 of the photovoltaic system 1 during the power supply grid failure. An energy flow manager can be adapted to monitor and control energy flows between the inverter 4 and other entities of the photovoltaic system 1, in particular power-consuming devices of the load network 7. Other entities comprise photovoltaic modules 3 of the photovoltaic array 2 as well as the at least one storage unit 10 of the photovoltaic system 1. The energy flow manager can also monitor and control the momentary energy flow between the photovoltaic system 1 and the power supply grid 16.

The photovoltaic system 1 can operate in a normal operation mode or in an emergency operation mode. In the normal operation mode the PV system 1 can supply power to the power supply grid 16 via the measurement device 5 or can receive power from the power supply grid 16 via the measurement device 5. It is also possible that in the normal operation mode of the PV system 1 no power transfer between the PV system 1 and the power supply grid 16 occurs. If a power supply grid failure of the power supply grid 16 is observed the PV system 1 does transit automatically from the normal operation mode to the emergency operation mode.

In a possible embodiment, the energy flow manager is executed on a processor of the energy management system 8 which is adapted to calculate momentary energy flows depending on data provided by different entities of the photovoltaic system 1 and including the measurement device 5 and/or loads of the load network 7. For instance, the energy flow manager can calculate momentary current flows depending on measured data.

A power supply grid failure is detected automatically by the energy flow manager on the basis of data provided by the measurement device 5 of the photovoltaic system 1. As soon as a power supply grid failure has been detected by the energy flow manager, the emergency switch 6 of the photovoltaic system 1 is automatically opened (switched-off) by a controller of the inverter 4 or by the energy flow manager to disconnect the power supply grid 16 from the photovoltaic system 1. This causes an interruption of the energy flow between the inverter 4 and the power supply grid 16 as long as the photovoltaic system 1 operates in the emergency operation mode.

In a possible embodiment, the energy flow manager can be executed on a processor of the energy management system 8 of the photovoltaic system 1 as shown in FIG. 1. In an alternative embodiment, the energy flow manager can also be executed on a remote web portal server 14 which may be connected via the Internet or another data network to the photovoltaic system 1, in particular to an interface of the energy management system 8.

In a preferred embodiment, the energy flow manager is executed on a processor of the energy management system 8 because a power supply grid failure of the power supply grid 16 may also cause an interruption of the Internet 15 which disconnects the web portal server 14 from the photovoltaic system 1.

If an interruption of the Internet connection caused by a power supply grid failure is detected by the energy flow manager, the energy flow manager executed on the processor of the energy management system 8 can notify the user U by means of the user interface 13 about the emergency operation mode of the photovoltaic system 1 triggered by the power supply grid failure and also about the unwanted interruption of the Internet connection caused by this power supply grid failure. When the energy flow manager detects the power supply grid failure and/or the interruption of the Internet connection caused by this power supply grid failure, the energy flow manager changes a mode of the photovoltaic system 1 from a normal operation mode to an emergency operation mode.

In the illustrated embodiment of FIG. 1, the user interface 13 is integrated in a user equipment 12 communicating with the energy management system 8 via a wireless connection such as wireless fidelity WiFi. In an alternative implementation, the user interface 13 can also be integrated in the energy management system 8 itself. Further, the user interface 13 can also be connected to other devices communicating with the energy management system 8 such as a LED display board which may be hung on a wall of the facility.

In a possible embodiment, also a power supply grid failure triggering an emergency operation can also be simulated by the energy flow manager in a specific simulation operation mode selected by a user or by a remote control operator. In this simulation, an expected remaining operation time of the photovoltaic system 1 is calculated based on the current configuration of the photovoltaic system 1 and forecast data. The simulation can be performed in the background periodically, e.g. each hour, to provide the user U with an expected emergency operation time period output via the user interface 13.

The user equipment 12 comprises, in a preferred embodiment, an energy management application APP which is adapted to inform the user U via the user interface 13 of the user equipment 12 about a current operation mode (the normal operation mode or the emergency operation mode) of the photovoltaic system 1. Further, the energy management application APP can be adapted to output predictions and/or recommendations to the user U on handling the different power-consuming devices of the load network 7 of the photovoltaic system 1 during the current operation mode of the photovoltaic system 1.

In this embodiment, the energy management application APP forms a bridge between the user U and the energy flow manager which may be executed on a processor of the energy management system 8. The energy flow manager executed on the processor of the energy management system 8 can receive user inputs which form responses to the output recommendations via the energy management application.

The predictions and recommendations are calculated in a preferred embodiment by the energy flow manager for the emergency operation mode of the photovoltaic system 1 on the basis of collected data provided by the different entities of the photovoltaic system 1 during the emergency operation mode. These different entities can comprise different power-consuming loads connected in the load network 7 but also other entities, in particular the measurement device 5, the emergency switch 6, a controller of the inverter 4 and a battery management system BMS of the storage unit 10. Further, the predictions and recommendations which are calculated by the energy flow manager can also be based on data collected during a normal operation mode of the photovoltaic system 1 before the power supply grid failure of the power supply grid 16 has been detected and the emergency switch 6 has been opened.

The collected data can comprise data collected during the normal operation mode before switch-off of the emergency switch 6 and data collected after the emergency switch 6 has been switched off and the photovoltaic system 1 has already entered the emergency operation mode. The collected data can be stored in a possible implementation in a local data memory, for instance the local memory 9 illustrated in FIG. 1.

The collected data stored in the data memory 9 can comprise solar generation capacity data, solar irradiation data, solar generation capacity forecast data, load usage and power consumption data, load usage and power consumption forecast data, load priority data, initial user input data, storage unit energy level data, user input data, in particular user input data performing responses to predictions and recommendations output via the user interface 13 as well as measurement device data generated by the measurement device 5 of the photovoltaic system 1.

The recommendations calculated by the energy flow manager based on the collected and stored data can comprise recommendations with respect to performing a shutdown or a power consumption reduction of the power-consuming loads of the load network 7 during the operation in the emergency operation mode of the photovoltaic system 1.

The shutdown does comprise in a possible implementation a fully automatic shutdown of the power-consuming loads of the load network 7. In an alternative embodiment, the shutdown can comprise a semi-automatic shutdown of the power-consuming loads or a manual shutdown of different single power-consuming loads within the load network 7 in response to a user input command. Also, a reduced power consumption of the different power-consuming loads in the load network 7 can be performed either fully automatically, semi-automatically or in response to a manual shutdown according to input data received from the user U via the user interface 13.

The different loads of the load network 7 of the photovoltaic system 1 can in a possible embodiment be configurable by the user U as to perform a fully automatic, semi-automatic or a manual shutdown and/or a power consumption reduction during the emergency operation mode notified to the user U via the user interface 13 of the photovoltaic system 1. In the illustrated embodiment of FIG. 1, the user equipment 12 communicating with the energy management system 8 comprises a mobile user equipment 12 connected via a wireless link such as a WIFI connection with the energy management system 8 of the photovoltaic system 1.

The user interface 13 can comprise in a possible implementation also a graphical user interface, in particular a touchscreen which can be operated by the user U. The user interface 13 can also comprise a microphone to receive user commands as well as loudspeakers to output recommendations and/or predictions to the user U acoustically.

Figure 2:
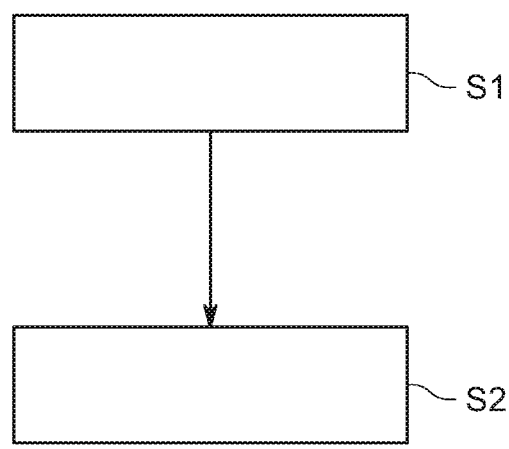
FIG. 2 shows a flowchart of a possible exemplary embodiment of a method for managing an energy flow within a photovoltaic system according to a further aspect of the present invention.

FIG. 2 illustrates a possible exemplary embodiment of a method for managing an energy flow within a photovoltaic system 1 according to a further aspect of the present invention. In the illustrated embodiment of FIG. 2, the method comprises two main steps.

In a first step S1, a user U is notified by means of a user interface 13 about an emergency operation mode of the photovoltaic system 1 triggered by a detected power supply grid failure of the power supply grid 16. Accordingly, the user U becomes aware that the photovoltaic system 1 now operates in the emergency operation mode and no longer in the normal operation mode where the photovoltaic system 1 is connected to the power supply grid 16.

In a further step S2, recommendations for handling the power-consuming loads of the load network 7 and/or other entities of the photovoltaic system 1 are calculated by a processor of the energy management system 8 during the emergency operation mode. These calculated recommendations are output to the user U by means of the user interface 13 of a device.

Figure 3:
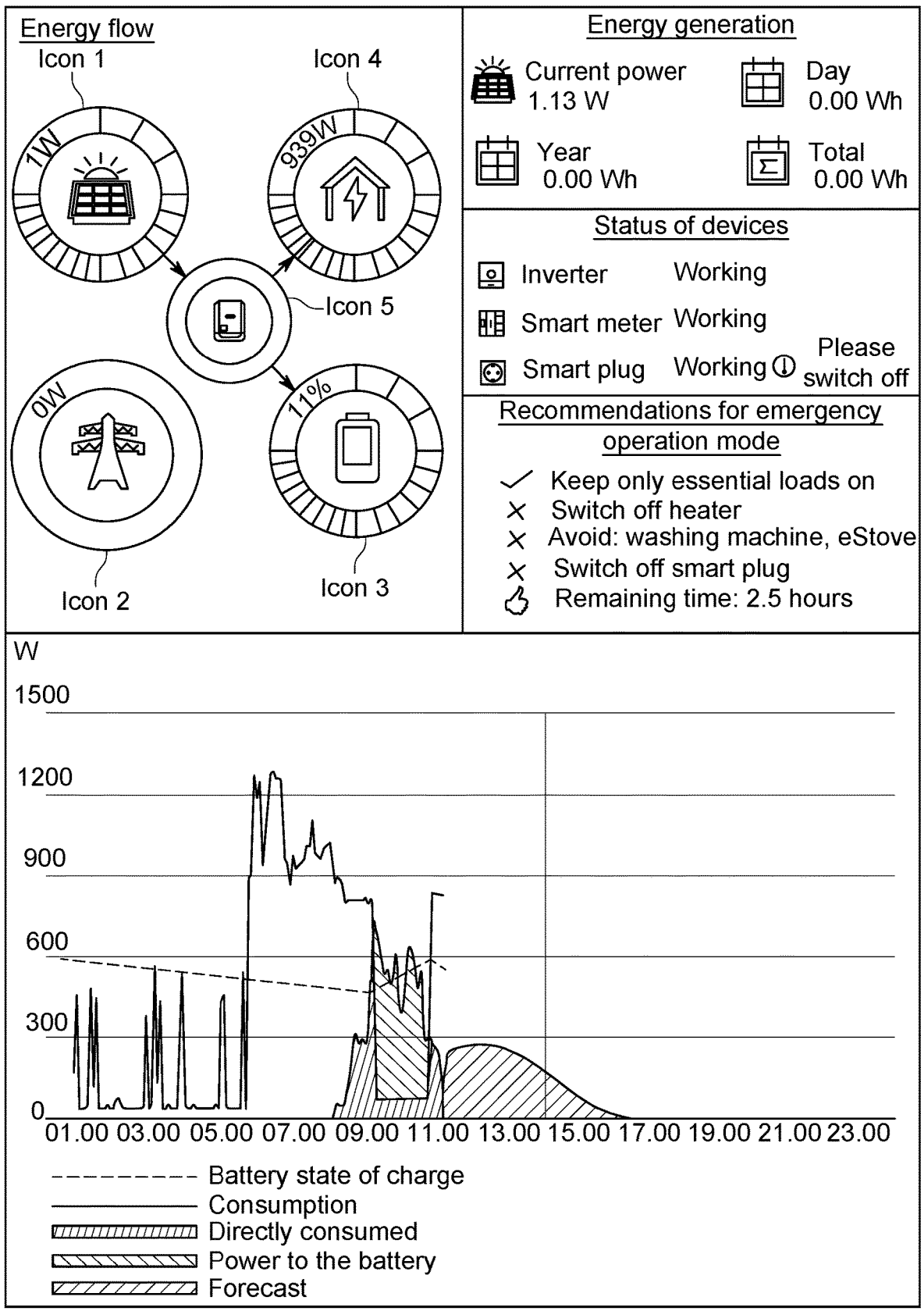
FIG. 3 shows a possible exemplary implementation of a graphical user interface used by the energy management system according to the present invention.

FIG. 3 shows a possible exemplary implementation of a graphical user interface 13 which can be used by the method and system 1 according to the present invention to assist a user U in performing an efficient energy management of the photovoltaic system 1. A first icon, ICON1, on the graphical user interface represents a photovoltaic array 2 of the photovoltaic system 1. Further, a second icon, ICON2, represents symbolically the physical power supply grid 16. A third icon, ICON3 represents the at least one storage unit 10 of the photovoltaic system 1. A fourth icon, ICON4, represents power-consuming devices of the load network 7. In the center of the graphical user interface shown in FIG. 3, the inverter 4 is represented by a fifth icon, ICON5. There are different energy flows between the different entities illustrated in FIG. 3. As long as the photovoltaic array 2 receives solar irradiation, it generates a DC power that is supplied to the DC side of the inverter 4. This energy flow is represented by an arrow A1 in FIG. 3. The AC power is consumed by power-consuming loads of the load network 7 and a corresponding energy flow from the inverter 4 to the power-consuming loads is represented by an arrow A4 shown in FIG. 3. Moreover, energy can be stored by the inverter 4 into the energy storage unit 10 as represented by arrow A3. In another scenario, energy can also flow from the energy storage 10 to the inverter 4 such as the direction of arrow A3 is inverted. In the illustrated embodiment, there is no displayed energy flow between the power supply grid represented by icon ICON2 and the inverter 4 represented by icon ICON5. Accordingly, no arrow is displayed on the graphical user interface between ICON2 and ICON5 as shown in FIG. 3. A missing arrow between the power supply grid ICON2 and the inverter ICON5 indicates to a user U that there is no exchange of energy between the photovoltaic system 1 and the power supply grid 16 indicating that the local photovoltaic system 1 now operates in an emergency operation mode.

In the example shown in FIG. 3, the photovoltaic system 1 has already entered the emergency operation mode in response to a detected power supply grid failure. As can be seen in FIG. 3, the user U receives recommendations about how to handle different entities of the photovoltaic system 1 during the emergency operation mode via the graphical user interface. These recommendations are calculated automatically based on the configuration of the system 1. The user U may receive general recommendations such as to switch off devices of the load network 7 which are absolutely not necessary to operate and retain operation of only devices which are absolutely necessary.

For instance, the user U may be notified to disconnect a redundant entity or load thus keeping the operation of essential loads such as an emergency lighting within a facility. These recommendations can also be calculated on the basis of a priority configuration given by a user U or operator in a setup of the photovoltaic system 1. The user U may also be informed to avoid operation of loads having a very high power consumption such as a washing machine or a heater. The energy flow manager may also calculate automatically how long an emergency operation mode of the remaining loads of the load network 7 can be maintained.

For instance, a user U may be informed that the emergency operation mode caused by the power supply grid failure and disconnection from the power supply grid 16 allows further operation of the remaining loads only for a calculated time of several hours, for instance 2.5 hours. The user U may also receive a graphical power forecast as also illustrated in FIG. 3.

If a power supply grid failure is detected, the energy flow manager notifies the user U about the entered emergency operation mode, for instance by no longer displaying an arrow between the power supply grid 16 and the inverter 4. The energy flow manager can also output a warning to the user U via the user interface 13, for instance an acoustic warning signal informing that the photovoltaic system 1 has been separated from the power supply grid 16. Further, the user U receives additional recommendations about how to handle loads and other entities within the photovoltaic system 1 in the emergency operation mode. The energy flow manager can automatically disconnect some redundant loads of the load network 7 in case of the power supply grid failure in the emergency operation mode without intervention of the user U. In contrast, other entities or loads may require a specific manual command from the user U to switch off the load or entity in case of an emergency operation mode. During a setup phase, in a configuration mode, the user U can configure the photovoltaic system 1 to indicate which loads or entities are to be switched off automatically in case of detected power supply grid failures and which loads or entities require a manual switch-off command via the interface 13 in case of a detected power supply grid failure. Accordingly, in a possible embodiment, the energy management system 8 comprises a configuration storage or memory comprising, in a possible implementation, a table of loads of the load network 7 and other entities of the photovoltaic system 1. For each load or entity, an associated configuration entry indicates whether the specific load or entity requires intervention of the user U to switch off or not. For instance, a user U may indicate that a power-consuming heater can be switched off automatically by the energy flow manager in case that a power supply grid failure is detected whereas another power-consuming load such as a washing machine can continue its operation in case that no specific user input command to switch off the washing machine is input into the user interface 13.

Accordingly, the energy flow manager of the energy managing system according to the present invention can optimize the energy flow in an emergency situation. This can also be performed on the basis of forecast data. The collected data stored in the data memory 9 can for instance comprise solar generation capacity forecast data as well as load usage and power consumption forecast data. Some forecast data may be supplied during normal operation mode via the still operating Internet 15 from the web portal server 14 or other services generating forecast data. This forecast data may for instance comprise weather indication data or solar generation capacity forecast data. In this way, the energy flow manager can calculate for a defined time such as 24 hours at least an estimation of the photovoltaic energy or power generated by the photovoltaic modules 3 of the photovoltaic array 2. Further, the energy flow manager has access to information about the storage unit energy level, SoC, of the storage unit 10.

After the photovoltaic system 1 has entered the emergency operation mode, the energy flow manager can initiate an interactive dialog with the user U via the user interface 13 to output recommendations to the user U and in return to receive user feedbacks and control commands. The user feedback can be received via the executed energy management application APP. In a possible embodiment, the energy management application APP can be loaded by the user U from a database of the web portal server 14.

In a setup mode of the application APP, a user U can perform configurations concerning the power-consuming devices of the load network 7 and the other entities of the respective photovoltaic system 1. The user U may also input additional parameters such as the time period or time window for the forecast data. For instance, the user U may indicate whether forecast data for the next 24 hours shall be stored or for a longer time period. During the setup, the energy flow manager can start automatically to communicate with all relevant entities of the photovoltaic system 1 via a local communication bus to receive information about the entities and loads available in the local photovoltaic system 1. Accordingly, the energy flow manager can collect information about the different power-consuming devices and other entities connected to the inverter 4 of the photovoltaic system 1 to generate a list displayed to the user U via the user interface 13. The user U may perform individual configurations for the displayed available loads and entities.

For instance, a list or a table can indicate that the local load network 7 comprises a first heater H1, a second heater H2 and a washing machine W1. In a possible embodiment, the user U can select for instance that heater H2 shall be switched off automatically in case of a power supply grid failure whereas heater H1 and the washing machine W1 require a manual shutdown command input by the user U in case of such a situation. Accordingly, in this simple example, the energy flow manager will switch off heater H2 automatically if a power supply grid failure is detected. The energy flow manager will, in such a situation, only display heater H1 and the washing machine W1 as "remaining power-consuming entities" of the load network 7 to the user U and wait for a user command whether the heater H1 and/or the washing machine W1 shall be switched off as well. In this simple example, the user U may choose also to switch off heater H1 to keep the operation of the washing machine W1.

When displaying the heater H1 and the washing machine W1 as potential loads to be switched off in the emergency operation mode, the energy flow manager can give additional information about the respective affected loads to assist the user U in making his decision. For instance, the energy flow manager can indicate the power consumed by the respective loads in Watt. Further, the energy flow manager may recommend the user U to turn off the load of the load network 7 having a higher power consumption than another load.

In particular, in an industrial environment, the energy flow manager can perform additional calculations depending on a current energy flow situation and the user input. For instance, a user input can be evaluated automatically by the energy flow manager to avoid unwanted consequences for the operation of the respective facility. For instance, if operation of one load within the load network 7 requires the operation of another load 7 within the same load network 7, the energy flow manager will check logically whether the user input is consistent to this relationship.

For instance, if the user U inputs that a first load shall continue to operate and that a second load shall be switched off but the operation of a second load is essentially necessary for the operation of the first load, this user input is inconsistent and the energy flow management application APP will give a corresponding hint to the user U via the user interface 13. Accordingly, in a possible embodiment, the energy management application APP can also perform automatically logical consistency checks of the user commands input by the user U via the user interface 13.

The energy flow manager can collect data during the normal operation mode of the system 1 from various data sources. For instance, solar generation capacity data can be collected for a predefined number of past days and for a predefined number of future days. Further, solar irradiation information data can be collected for a past number of days and for a future number of days. Moreover, load usage data can be collected from a measuring device for a predefined number of past days and a predefined number of future days. Further, the energy flow manager can collect user input data concerning a load usage of loads in the load network 7.

Based on the collected information, forecast data can be calculated by the energy flow manager. For instance, the energy flow manager can calculate an expected daily photovoltaic energy generation of energy by the photovoltaic array for a future number of days based on the collected information. Further, an expected daily load usage and a total load usage for each of the loads in the load network 7 can be calculated based on the collected information and user inputs.

The energy flow manager may also determine a current energy level of the storage unit 10. A future energy level of the inverter 4 and/or energy storage 10 can be predicted based on the calculated photovoltaic predictions, calculated load usage predictions and a determined storage unit energy level.

Based on these predictions, the energy flow manager can provide recommendations for the users U about handling and accessing the loads and other entities of the photovoltaic system 1. In an embodiment, the energy flow manager provides recommendations and/or automatically turns off one or more power-consuming loads of the load network based on a current energy level and the future energy level of the energy storage 10.

The energy flow manager according to the present invention assists efficiently a user U in the task of maintaining the operation of most relevant entities and loads of a photovoltaic system 1 in case of a detected power supply grid failure. In a possible embodiment, the power supply grid failure can be detected automatically based on measurement device data such as current, frequency, etc. generated by the measurement device 5 and notified to the energy flow manager. According to the invention, in an alternative implementation, the power supply grid failure is notified by a remote controller of the power supply grid 16 via a communication interface of the energy management system 8 running the energy flow manager. The energy flow manager allows a user to adjust the responses to predictions and recommendations in response to changing situations, such as a status of power supply grid 16. The energy flow manager displays a dynamic list of available power-consuming loads to the user. The energy flow manager further updates the dynamic list in response to any response from the user.

The energy flow manager dynamically schedules an amount of power to each of the available power-consuming loads based on at least one of user preferences, and/or the collected data stored in the data memory.

The energy flow manager is capable of ingesting collected data stored in the data memory to train machine learning models, in particular, models to estimate an energy consumption during the emergency operation mode and provide recommendations to the user with respect to a handling of power-consuming loads of a load network 7 of the photovoltaic system 1 during the power supply grid failure. The energy flow manager is capable of recording, storing, and/or analyzing historical energy consumption data corresponding to a user during the normal operation mode and the emergency operation mode to train machine learning models. The energy flow manager continuously receives energy consumption data from each of the power-consuming devices and continuously adds new historical data to train machine learning models. The user can, thus extract more flexibility during the emergency operation mode.

The energy flow manager may employ machine learning models to perform analysis of the user's consumption trends and patterns and create certain recommendations and suggestions for using each of the power-consuming devices of the load network 7 of the photovoltaic system 1 during the emergency operation mode based on such an analysis.

The energy flow manager can also provide recommendations about how to extend the expected remaining emergency operation lifetime of the photovoltaic system 1 in case of the emergency operation mode. The energy flow manager may, for example, recommend to add a further battery 10 of a specific storage capacity to extend the operation lifetime by two hours.

The invention claimed is:

1. An energy management system of a photovoltaic system, the energy management system being adapted to manage an energy flow of the photovoltaic system and to run an energy flow manager,
wherein the energy flow manager is configured to calculate recommendations based on collected data stored in a local memory of the energy management system,
wherein the recommendations comprise recommendations with respect to performing a fully automatic, semi-automatic and/or manual shutdown of power-consuming loads of a load network during its operation in an emergency operation mode of the photovoltaic system according to an individual configuration of the respective power-consuming load performed by a user in a setup mode, wherein the emergency operation mode of the photovoltaic system is triggered by a power supply grid failure of a power supply grid connected to the photovoltaic system,
wherein the photovoltaic system further comprises a measurement device, wherein the measurement device is configured to generate data,
wherein the energy flow manager is configured to detect a power supply grid failure of the power supply grid automatically on the basis of the data provided by the measurement device, or
wherein the energy management system includes a communication interface and a remote controller is configured to notify a power supply grid failure of the power supply grid to the energy flow manager via the communication interface,
wherein said energy management system further comprises a user interface that is configured to
notify a user about the emergency operation mode of the photovoltaic system and
provide recommendations for the user with respect to a handling of power-consuming loads of the load network of the photovoltaic system during the power supply grid failure.

2. The energy management system according to claim 1 wherein the photovoltaic system comprises at least one inverter adapted to convert a DC power generated by photovoltaic modules of a photovoltaic array into AC power, wherein in a normal operation mode of the photovoltaic system AC power can be fed via the measurement device of the photovoltaic system into the power supply grid, or AC power can be received by the photovoltaic system via the measurement device of the photovoltaic system from the power supply grid.

3. The energy management system according to claim 2 wherein the inverter of the photovoltaic system is connected to at least one storage unit of the photovoltaic system used to store electrical power.

4. The energy management system according to claim 3 wherein the energy flow manager of the energy management system is adapted to monitor and control energy flows between the inverter of the photovoltaic system and other entities of the photovoltaic system comprising the power-consuming loads of the load network and comprising the photovoltaic array and the at least one storage unit of the photovoltaic system and wherein the energy flow manager of the energy management system is adapted to monitor and control the energy flow between the photovoltaic system and the power supply grid.

5. The energy management system according to claim 4 wherein the energy flow manager is executed on a processor adapted to calculate momentary energy flows depending on data provided by different entities of the photovoltaic system including the measurement device and/or the power-consuming loads of the load network.

6. The energy management system according to claim 2, wherein if the power supply grid failure is detected on the basis of the data provided by the measurement device of the photovoltaic system, then an emergency switch of the photovoltaic system is automatically opened by a controller of the inverter or by the energy flow manager to disconnect the power supply grid from the photovoltaic system causing the interruption of the energy flow between the inverter and the power supply grid as long as the photovoltaic system operates in the emergency operation mode.

7. The energy management system according to claim 1, wherein the energy flow manager is executed on a processor of the energy management system of the photovoltaic system and/or on a cloud server of a cloud-based web portal connected via an Internet connection to the communication interface of the energy management system of the photovoltaic system.

8. The energy management system according to claim 7, wherein if an interruption of the Internet connection caused by the power supply grid failure of the power supply grid is detected, the energy flow manager executed on the processor of the energy management system is adapted to notify the user by means of the user interface about the emergency operation mode of the photovoltaic system triggered by the power supply grid failure and/or about the interruption of the Internet connection caused by the power supply grid failure.

9. The energy management system according to claim 1, wherein the user interface is integrated in a mobile user equipment connected via a wireless link with the energy management system and communicating with the energy management system, or wherein the user interface is a stationary user terminal and the energy management system is connected via a data interface to a stationary user terminal, or wherein the user interface is integrated in the energy management system of the photovoltaic system, or wherein the user interface is integrated in a visual display unit.

10. The energy management system according to claim 9 wherein the mobile user equipment comprises an energy management application adapted to inform the user via the user interface of the mobile user equipment about the current operation mode of the photovoltaic system and to output predictions and recommendations to the user how to handle the power-consuming loads of the load network of the photovoltaic system during the current operation mode of the photovoltaic system.

11. The energy management system according to claim 10 wherein the predictions and recommendations are calculated by the energy flow manager for the emergency operation mode of the photovoltaic system on the basis of collected data provided by the entities of the photovoltaic system during the emergency operation mode and on the basis of the data collected during the normal operation mode of the photovoltaic system before the power supply grid failure has been detected and an emergency switch has been opened by the controller of the inverter or by the energy flow manager to interrupt the energy flow between the photovoltaic system and the power supply grid.

12. The energy management system according to claim 11 wherein the collected data is stored in the local data memory of the energy management system, wherein the collected data stored in the local data memory comprises
- solar generation capacity data,
- solar irradiation data,
- solar generation capacity forecast data,
- load usage and power consumption data,
- load usage and power consumption forecast data,
- load priority data,
- initial user input data,
- storage unit energy level data,
- response to predictions and recommendations (user input), and
- measurement device data.

13. The energy management system according to claim 11, wherein the recommendations calculated by the energy flow manager based on the collected data further comprise recommendations with respect to reduce power consumption of power-consuming loads of the load network of the photovoltaic system during its operation in the emergency operation mode, wherein different loads of the load network of the photovoltaic system are configurable by the user as to perform the fully automatic, the semi-automatic or the manual shutdown and to reduce power consumption in the emergency operation mode notified to the user via the user interface of the photovoltaic system.

14. A method for managing an energy flow of a photovoltaic system, using an energy management system according to claim 1, the method comprising:
- detecting a power supply grid failure of a power supply grid connected to the photovoltaic system on the basis of data generated by a measurement device of the photovoltaic system or
- notifying a power supply grid failure of a power supply grid connected to the photovoltaic system by a remote controller of the power supply grid via a communication interface of the energy management system;
- notifying a user by means of a user interface about an emergency operation mode of the photovoltaic system triggered by the detected or notified power supply grid failure of the power supply grid; and
- calculating recommendations for handling power-consuming loads of a load network and other entities of the photovoltaic system during the emergency operation mode, wherein the calculated recommendations are output to the user by means of the user interface,
- wherein the recommendations are calculated by an energy flow manager based on collected data stored in local memory of the energy management system, wherein the calculated recommendations comprise recommendations with respect to performing a fully automatic, semi-automatic and/or manual shutdown of the power-consuming loads of the load network during its operation in the emergency operation mode according to an individual configuration of the respective power consuming load in a setup mode.

* * * * *